(12) United States Patent
Sharpe

(10) Patent No.: US 7,587,997 B2
(45) Date of Patent: Sep. 15, 2009

(54) HYDROGEN GAS INJECTOR PLUG FOR DIESEL ENGINES

(76) Inventor: Thomas H. Sharpe, 55 Dorr Dr., North Augusta, SC (US) 29841

( * ) Notice: Subject to any disclaimer, the term of this patent is extended or adjusted under 35 U.S.C. 154(b) by 104 days.

(21) Appl. No.: 11/979,940

(22) Filed: Nov. 9, 2007

(65) Prior Publication Data
US 2008/0271706 A1 Nov. 6, 2008

Related U.S. Application Data

(60) Provisional application No. 60/924,252, filed on May 4, 2007.

(51) Int. Cl.
*F02M 57/00* (2006.01)
*F02M 61/04* (2006.01)
(52) U.S. Cl. ...................... 123/1 A; 123/468
(58) Field of Classification Search .......... 123/1 A, 123/3, DIG. 12, 25 B, 25 A, 25 R, 25 D, 123/468, 470, 25 P
See application file for complete search history.

(56) References Cited
U.S. PATENT DOCUMENTS

| | | |
|---|---|---|
| 4,185,593 A | 1/1980 | McClure |
| 4,380,978 A | 4/1983 | Maynard et al. |
| 4,448,160 A | 5/1984 | Vosper |
| 5,085,176 A | 2/1992 | Brinkley |
| 5,115,768 A | 5/1992 | Peschka et al. |
| 5,394,852 A | 3/1995 | McAlister |
| 5,715,788 A | 2/1998 | Tarr et al. |
| 6,508,210 B2 * | 1/2003 | Knowlton et al. ............ 123/3 |
| 7,383,792 B1 * | 6/2008 | Sharpe ...................... 123/1 A |
| 2004/0094134 A1 | 5/2004 | Redmond et al. |

* cited by examiner

*Primary Examiner*—Michael Cuff
*Assistant Examiner*—Ka Chun Leung
(74) *Attorney, Agent, or Firm*—Richard C. Litman

(57) ABSTRACT

The hydrogen gas injector plug for diesel engines employs an injector plug for generating hydrogen gas from water. Pressurized hot water is pulsed into contact with a heated metallic catalyst. The pressurized hot water turns to steam and disassociates into a mixture of oxygen and hydrogen gases. The catalyst removes the oxygen gases from the gaseous mixture. The hydrogen gas expands into a combustion chamber and is burned therein, creating a pressure to drive an engine piston disposed in the combustion chamber.

15 Claims, 2 Drawing Sheets

HYDROGEN GAS INJECTOR PLUG FOR DIESEL ENGINES

CROSS-REFERENCE TO RELATED APPLICATION

This application claims the benefit of U.S. Provisional Patent Application Ser. No. 60/924,252, filed May 4, 2007.

BACKGROUND OF THE INVENTION

1. Field of the Invention

The present invention generally relates to internal combustion engines. More specifically, the present invention is drawn to a hydrogen gas injector plug for diesel engines for injecting hydrogen gas into the combustion chamber of a diesel engine for use as a fuel for powering the engine.

2. Description of the Related Art

The rising cost and diminishing supply of hydrocarbon fuels, i.e. gasoline and diesel fuel, have increased the criticality of developing or finding alternative fuels. Furthermore, pollution caused by burning hydrocarbon fuels is suspected of creating a "greenhouse" effect in the atmosphere, thereby creating problems that may have a bearing on the future course of human civilization. The art would certainly welcome a device that could utilize a virtually inexhaustible supply of a common element to power internal combustion engines, which device would also cause production of pollution-free byproducts. Thus a hydrogen gas injector plug for diesel engines which solves a part of the aforementioned problems is desired.

The use of hydrogen as a fuel to power engines has been contemplated for many years. Hydrogen is one of the most abundant elements on earth and combustion of this abundant element produces pollution-free water. Unfortunately because of its volatility, hydrogen poses many risks when stored in large quantities, thus creating problems in making the gas available to the general public. Thus, a hydrogen gas injector plug for diesel engines solving the aforementioned problems is desired.

SUMMARY OF THE INVENTION

The hydrogen gas injector plug for diesel engines employs a unique injector plug having the ability to generate hydrogen gas from water. Pressurized hot water is pulsed into contact with a heated, metallic catalyst. The pressurized hot water turns to steam and disassociates into a mixture of oxygen and hydrogen gases. The catalyst removes the oxygen gases from the gaseous mixture. The hydrogen gas expands into a combustion chamber and is burned therein, creating pressure to drive an engine piston disposed in the combustion chamber.

The plug includes a spring-biased valve movable by water pressure and arranged to admit timed pulses of water into a catalytic chamber. Hydrogen gas is generated in the catalytic chamber by means of a metallic catalyst. The metallic catalyst is configured as an array of nozzles fabricated from a metal or a mixture of metals. When heated to a predetermined temperature, the metallic nozzles react with steam to disassociate hydrogen gas therefrom. A plurality of outlets in the catalytic chamber open into the diesel engine combustion chamber for supplying the hydrogen gas thereto. The hydrogen gas ignites and combusts when compressed by the engine piston during the conventional compression stroke. Exhaust gases flow through the catalytic chamber and transfer heat to the catalyst in preparation for the next conventional engine cycle. No reaction will occur if the metal catalyst is below a certain temperature.

Accordingly, the invention presents a hydrogen gas injector plug for diesel engines capable of generating small amounts of hydrogen gas from water vapor when pulsed into contact with a metallic catalyst. The invention provides for improved elements thereof in an arrangement for the purposes described that are inexpensive, dependable and fully effective in accomplishing their intended purposes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
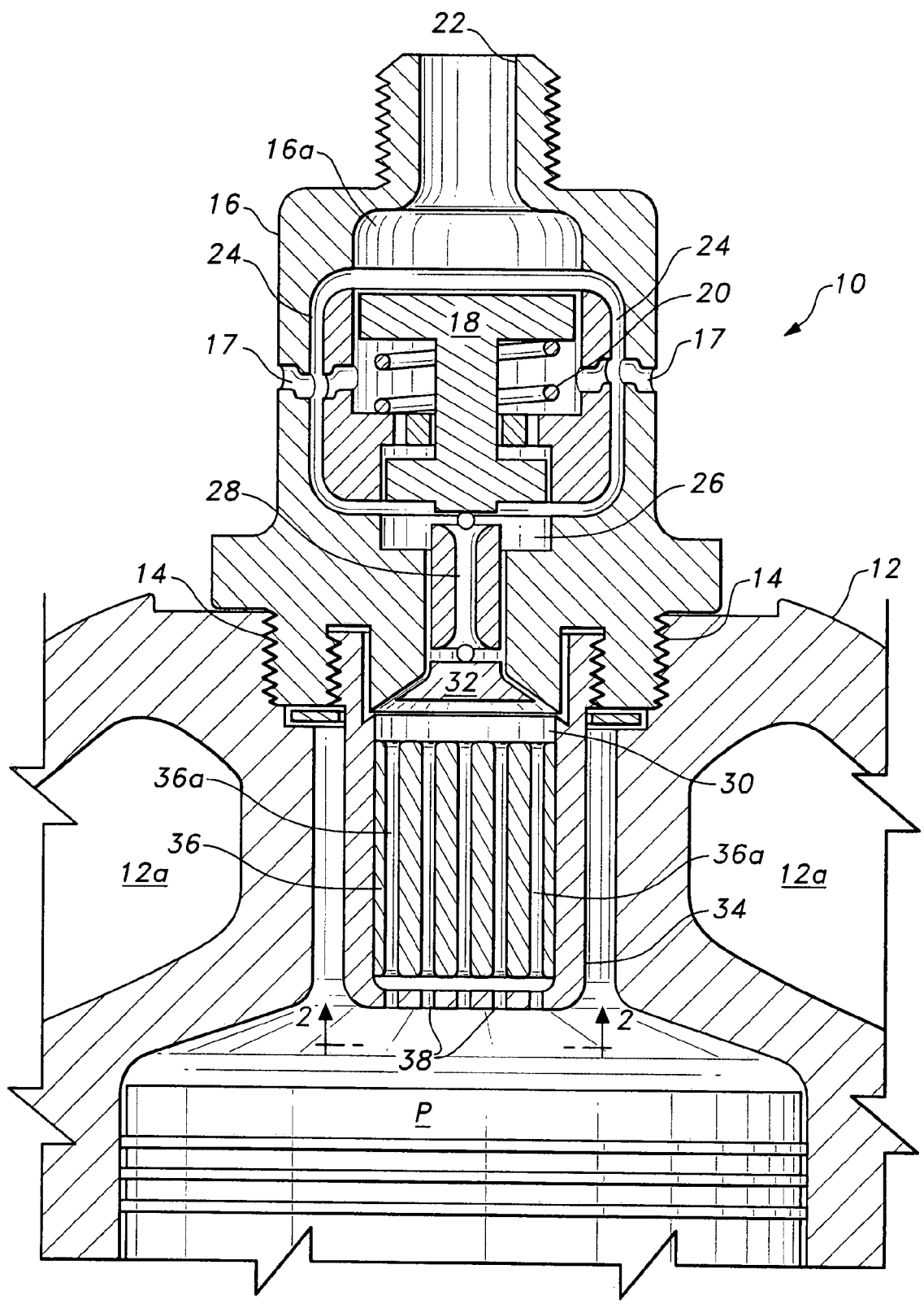
FIG. 1 is an environmental, perspective view of a hydrogen gas injector plug for diesel engines according to the present invention.
Figure 2:
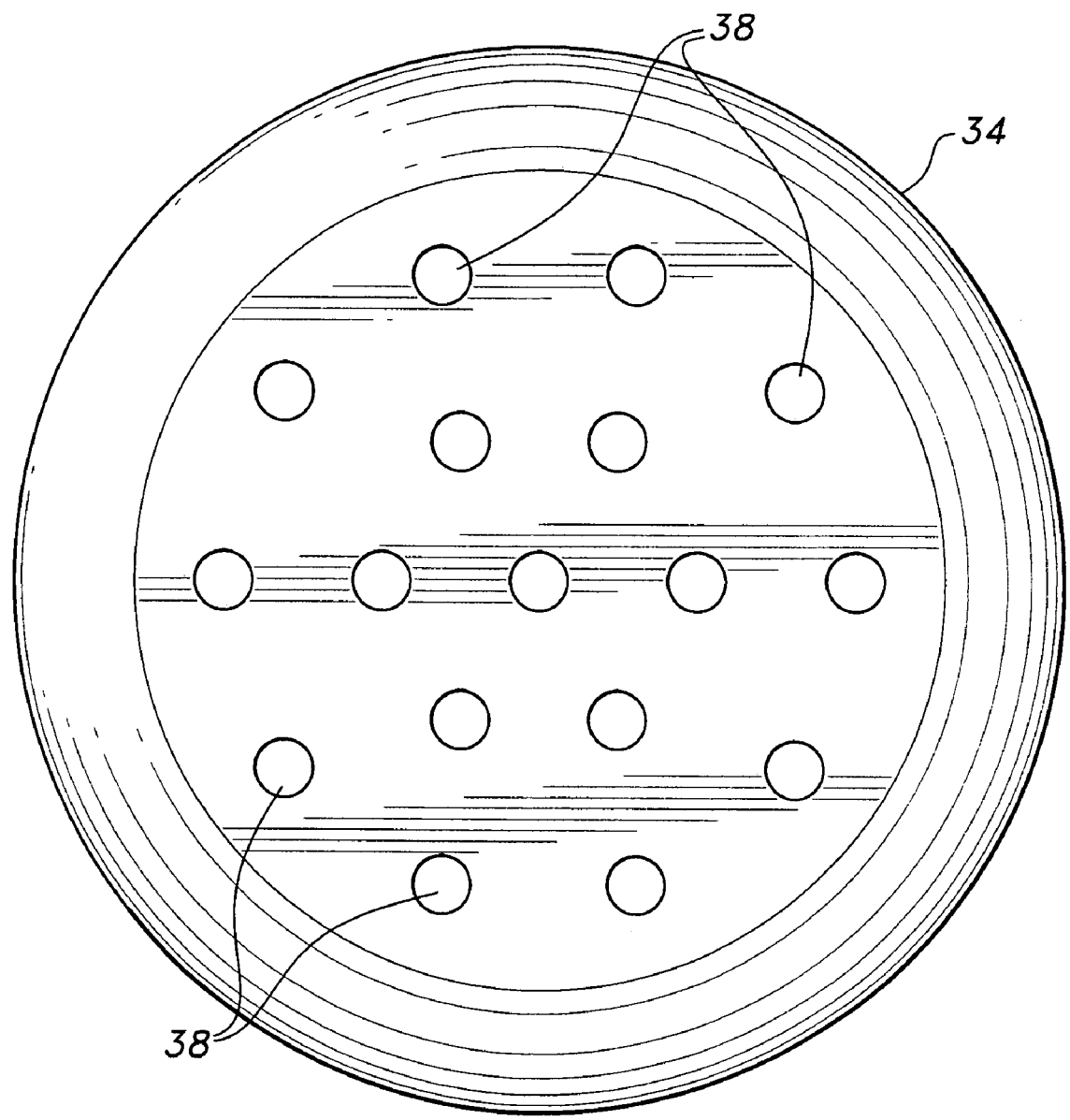
FIG. 2 is an end view of a hydrogen gas injector plug for diesel engines according to the present invention.

Attention is directed to FIGS. 1 and 2 wherein the hydrogen gas injector plug for diesel engines is generally indicated at 10. Plug 10 is inserted into the head 12 of a diesel engine via a threaded connection 14 in a conventional manner. A conventional coolant chamber 12a is provided for the head. Plug 10 comprises an upper casing 16 housing an upper chamber 16a therein. Openings 17 are provided for venting upper chamber 16a, as will be explained below. A stainless steel valve 18 is disposed in chamber 16a. Valve 18 is biased in an upward direction by a coiled spring 20. A water inlet line 22 opens into upper chamber 16a. Passageways 24 extend from upper chamber 16a and open into a lower chamber 26. A passageway 28 extends from lower chamber 26 and opens into catalytic chamber 30. A one-way stainless steel valve 32 is positioned between passageway 28 and catalytic chamber 30. Catalytic chamber 30 is housed within a lower casing 34. A metallic catalyst 36 is disposed in catalytic chamber 30. Metallic catalyst 36 comprises a metal plug having an array of passages 36a formed therethrough. The exit end of casing 34 is provided with an array of openings 38 in flow communication with catalytic chamber 30. Openings 38 open into the otherwise conventional combustion chamber of a diesel engine. The combustion chamber houses a piston P.

In use, as indicated above, pulses of high pressure hot water are injected through inlet 22 into chamber 16a. The pressurized water pushes valve 18 downward against the bias of spring 20. The downward movement of the valve 18 allows the pulsed charge of water to flow via passages 24 and 28 into catalytic chamber 30. The water changes to steam and disassociates when contacted by the hot metallic catalyst 36. Catalyst 36 removes oxygen from the disassociated gases and permits the hydrogen gases to flow into the combustion chamber. The hydrogen gases are ignited and burn in the combustion chamber, whereby the piston P is driven downward. Excess water in chamber 16a is vented through openings 17.

It is to be understood that the present invention is not limited to the embodiment described above, but encompasses any and all embodiments within the scope of the following claims.

I claim:

1. A hydrogen gas injector plug for diesel engines, comprising:

an injector plug body defining at least one chamber;

an inlet extending through the injector plug body for injecting a pulsed flow of water into the injector plug body; and a metallic catalyst disposed in the at least one chamber for disassociating the water injected through the inlet into hydrogen gas and oxygen, wherein said metallic catalyst comprises a metal plug having an array of passages defined therethrough.

2. The hydrogen gas injector plug according to claim 1, wherein said injector plug body is adapted for removably mounting on a combustion chamber of a diesel engine.

3. The apparatus according to claim 1, wherein the at least one chamber opens into a combustion chamber of a diesel engine.

4. A hydrogen gas injector plug for generating and injecting hydrogen gas into a combustion chamber of a diesel engine, comprising:

an upper casing defining an upper chamber and a lower chamber;

an inlet connected to the upper chamber, the inlet supplying a pulsed flow of water to the upper chamber;

at least one passageway extending from the upper chamber to the lower chamber for passage of water from the upper chamber to the lower chamber;

a lower casing detachably mounted to the upper casing, the lower casing defining a catalytic chamber therein;

a passage connecting the lower chamber to the catalytic chamber; and a catalyst disposed in the catalytic chamber.

5. The hydrogen gas injector plug according to claim 4, further comprising a valve disposed in the upper casing for controlling the passage of water from the upper chamber to the lower chamber.

6. The hydrogen gas injector plug according to claim 4, further including a valve positioned adjacent the passage connecting the lower chamber with the catalytic chamber for controlling the flow of water from the lower chamber to the catalytic chamber.

7. The hydrogen gas injector plug according to claim 4, wherein said catalyst is a metallic plug.

8. The hydrogen gas injector plug according to claim 4, wherein said lower casing has an exit end having an array of openings formed in the exit end.

9. A hydrogen gas injector plug for generating and injecting hydrogen gas into a combustion chamber of a diesel engine, comprising:

an upper casing having an upper chamber and a lower chamber defined therein;

an inlet connected to the upper chamber for supplying a pulsed flow of water to the upper chamber;

at least one passageway extending from the upper chamber to the lower chamber for passage of water from the upper chamber to the lower chamber;

a spring-biased valve disposed in the upper casing for controlling the passage of water from the upper chamber to the lower chamber;

a lower casing detachably mounted to the upper casing, the lower casing defining a catalytic chamber therein;

a passage connecting the lower chamber with the catalytic chamber;

a one-way valve positioned adjacent the passage connecting the lower chamber with the catalytic chamber for controlling the passage of water from the lower chamber to the catalytic chamber; and a catalyst disposed in the catalytic chamber.

10. The hydrogen gas injector plug according to claim 9, wherein said catalyst comprises a metallic plug.

11. The hydrogen gas injector plug according to claim 9, wherein said catalyst comprises a metallic plug having a plurality of passages therethrough.

12. The hydrogen gas injector plug according to claim 9, wherein said spring-biased valve and said one-way valve are fabricated from stainless steel.

13. The hydrogen gas injector plug according to claim 9, wherein said lower casing has an exit end and an array of openings formed in the exit end.

14. The hydrogen gas injector plug according to claim 9, further comprising a diesel engine having a combustion chamber, the hydrogen gas injector plug being removably mounted on the combustion chamber of the diesel engine.

15. The hydrogen gas injector plug according to claim 9, wherein said upper casing has a plurality of vent openings disposed therein.

* * * * *